United States Patent
Lemoine et al.

(10) Patent No.: US 7,634,410 B2
(45) Date of Patent: Dec. 15, 2009

(54) METHOD OF AUDIO-INTONATION CALIBRATION

(75) Inventors: Hubert Lemoine, Metz (FR); Jacky Munger, Marly (FR)

(73) Assignee: Speedlingua S.A., Zoug (CH)

( * ) Notice: Subject to any disclaimer, the term of this patent is extended or adjusted under 35 U.S.C. 154(b) by 724 days.

(21) Appl. No.: 10/634,744

(22) Filed: Aug. 6, 2003

(65) Prior Publication Data
US 2005/0074132 A1    Apr. 7, 2005

(30) Foreign Application Priority Data
Aug. 7, 2002    (FR) .................................. 02 10051

(51) Int. Cl.
G10L 11/00    (2006.01)
G10L 21/00    (2006.01)
G06F 17/20    (2006.01)
G10L 19/14    (2006.01)
G09B 19/04    (2006.01)

(52) U.S. Cl. ........................... 704/270; 704/8; 704/205; 434/185

(58) Field of Classification Search .................. 704/235, 704/226, 276, 268, 270, 556, 114, 37, 20, 704/473, 260, 256, 182, 223, 258; 381/101, 381/98
See application file for complete search history.

(56) References Cited

U.S. PATENT DOCUMENTS

| 4,212,119 | A |   | 7/1980  | Tomatis |           |
|-----------|---|---|---------|---------|-----------|
| 4,615,680 | A |   | 10/1986 | Tomatis |           |
| 5,327,521 | A | * | 7/1994  | Savic et al. | 704/272 |
| 5,362,240 | A | * | 11/1994 | Cave et al.  | 434/157 |
| 5,873,728 | A | * | 2/1999  | Jeong        | 434/185 |
| 5,895,220 | A |   | 4/1999  | Beller et al.|         |
| 5,966,687 | A | * | 10/1999 | Ojard        | 704/207 |
| 6,336,092 | B1| * | 1/2002  | Gibson et al.| 704/268 |
| 6,615,174 | B1| * | 9/2003  | Arslan et al.| 704/270 |

(Continued)

FOREIGN PATENT DOCUMENTS
EP    1 031 955    8/2000

(Continued)

OTHER PUBLICATIONS

Ki Seung Lee; Dae Hee Youn; Il Whan Cha, "A new voice transformation method based on both linear and nonlinear prediction analysis," Spoken Language, 1996. ICSLP 96. Proceedings., Fourth International Conference on, vol. 3, no.pp. 1401-1404 vol. 3, Oct. 3-6, 1996.*

(Continued)

*Primary Examiner*—David R Hudspeth
*Assistant Examiner*—Brian L Albertalli
(74) *Attorney, Agent, or Firm*—Young & Thompson

(57) ABSTRACT

An audio-intonation calibration method in which an audio signal emitted by a subject is reproduced to the auditory organs of the subject after real time processing, which comprises the following steps:
- acquisition of a model audio signal to be imitated;
- spectral analysis of the model audio signal;
- acquisition of an imitation audio signal emitted by the subject;
- spectral analysis of the imitation audio signal;
- comparison of the spectra of the model audio signal and the imitation audio signal;
- correction of the imitation audio signal as a function of the result of said comparison; and
- reproduction to the auditory organs of the subject of the corrected audio signal.

15 Claims, 7 Drawing Sheets

U.S. PATENT DOCUMENTS

| | | | |
|---|---|---|---|
| 6,836,761 | B1 | 12/2004 | Kawashima et al. |
| 7,149,682 | B2 * | 12/2006 | Yoshioka et al. ............ 704/205 |
| 7,149,690 | B2 | 12/2006 | August et al. |
| 7,204,787 | B2 | 4/2007 | Maekawa et al. |

FOREIGN PATENT DOCUMENTS

| | | |
|---|---|---|
| EP | 1 083 536 A2 | 3/2001 |
| EP | 1 139 318 | 10/2001 |
| FR | 1 195 239 | 11/1959 |
| FR | 2 260 153 | 8/1975 |
| FR | 2 303 434 | 10/1976 |
| FR | 2 431 743 | 2/1980 |
| FR | 2 495 361 | 6/1982 |
| FR | 2 546 323 | 11/1984 |
| FR | 2 674 660 | 10/1992 |
| FR | 2 686 442 | 7/1993 |
| JP | 61-6732 | 1/1986 |
| JP | 2000-003187 | 1/2000 |
| JP | 2001-117582 | 4/2001 |
| JP | 2001-159865 | 12/2001 |
| JP | 2002-91472 | 3/2002 |
| WO | WO 91/00582 | 1/1991 |
| WO | WO 92/05532 | 4/1992 |
| WO | WO 92 14229 | 8/1992 |
| WO | WO 98/07130 | 2/1998 |

OTHER PUBLICATIONS

Japanese Office Action, dated Sep. 14, 2007, in corresponding foreign application JP 2003-284731 with English translation.

* cited by examiner

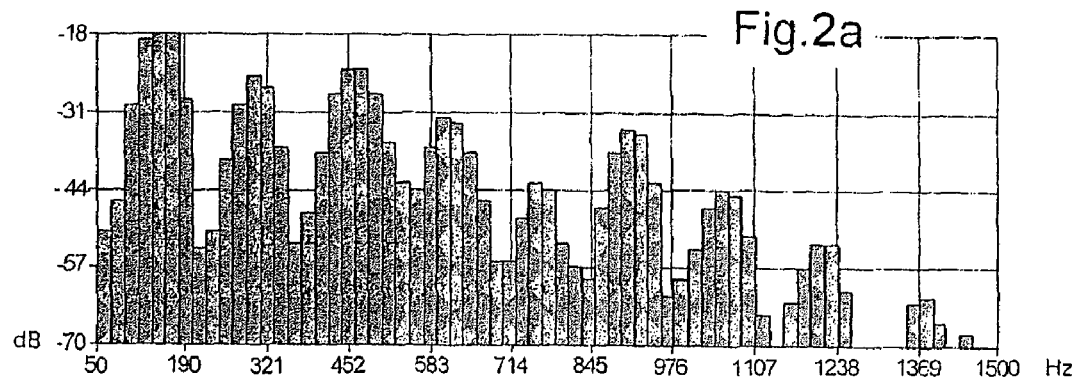
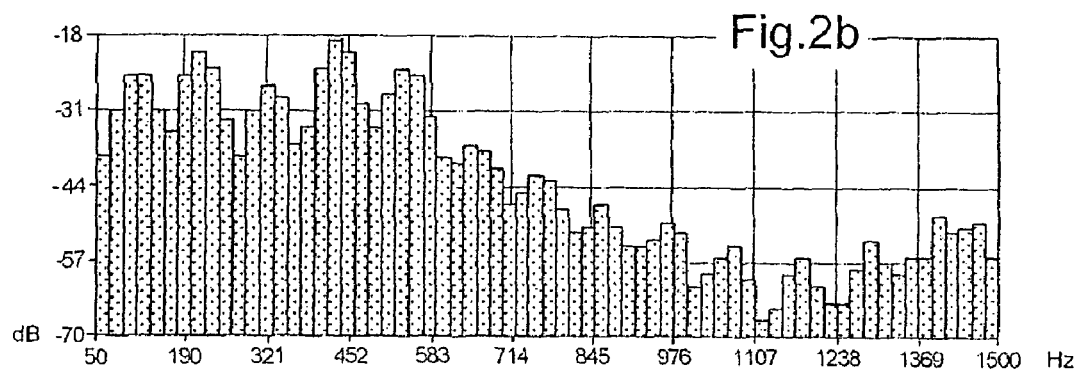
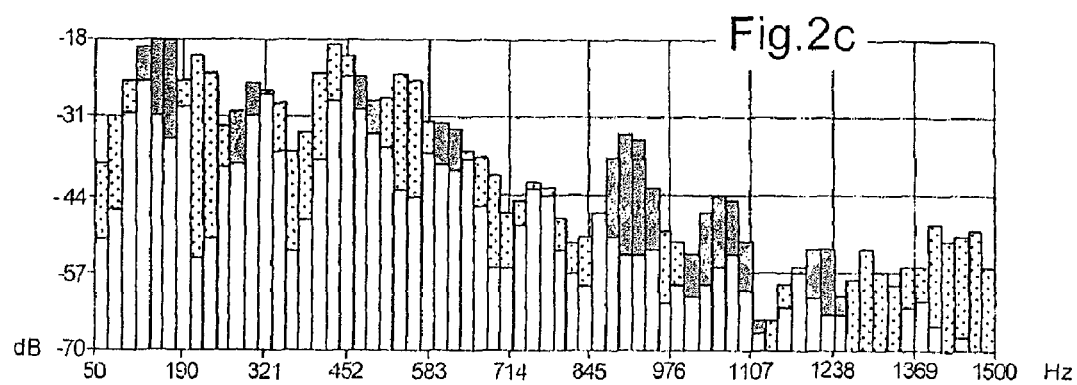
values to subtract     values to add

METHOD OF AUDIO-INTONATION CALIBRATION

BACKGROUND OF THE INVENTION

The present invention concerns an audio-intonation calibration method.

It also concerns a method of practicing speaking a language being studied by a subject and a method of performing a song by a subject.

Generally speaking, the present invention concerns a method in which the emission of an audio signal by a subject is modified by modifying the sound information that he receives when he speaks.

A method of this kind is based on a principle known in the art whereby the vocal provision of a subject, i.e. sounds that he emits, undergoes a major transformation as a function of the auditory provision applied to the same subject, i.e. sound information that he receives.

Using equipment in which an audio signal emitted by a subject is reproduced to the auditory organs of the subject after real time processing is known in the art, and especially in the particular field of teaching and practicing speaking languages.

A method of this kind is described in the document WO 92/14229 in particular.

That document describes a device in which an audio signal emitted by a subject is modified by processing it to take account of the characteristics of a foreign language being studied and of the harmonic content of that language. The modified audio signal is then furnished to the subject in real time by a vibratory signal, generally by a sound signal, in order to modify the audio signal emitted by the subject.

However, in the above document, the audio signal emitted by the subject is processed in a predetermined manner as a function of the bandwidth of the language being learned, and in particular as a function of the envelope curve of that bandwidth.

In practice, the signal processing circuit comprises a multifrequency equalizer that is adjusted in a predetermined manner as a function of the foreign language in question, and more particularly of the bandwidth of that language and the shape of that bandwidth, i.e. the envelope curve of the bandwidth. In practice, the equalizer consists of a plurality of successive filters set to different frequencies.

Thus frequency parameters of the equalizer are set in a predetermined manner by characteristics of the language being studied.

Similarly, the above document describes a second form of processing applied to the audio signal emitted by the subject in which adjustment parameters are established as a function of the sound vibration harmonic content of the utterance collected and parameters depending on the language being studied.

In this case, the parameters of a multifrequency equalizer are set by the difference between the processed signal coming from the effective vocal provision of the subject and predetermined characteristics of the language.

Thus the above document describes the creation from a first signal representative of the sound emitted by the subject of a second signal modified with respect to the first signal in a predetermined manner and as a function of the bandwidth of the language being learned, and in particular as a function of the envelope curve of that language, and a third signal which is derived from the first signal by modifying it as a function of the effective harmonic content of the utterance and characteristics of the language.

The signals are then selectively reproduced to the subject.

The above kind of prior art system has the drawback of using predefined parameter settings, taking no account of the type of audio signal emitted by the subject.

SUMMARY OF THE INVENTION

An object of the present invention is to improve existing audio-intonation calibration methods in order to simplify their use and widen their applications.

To this end, the present invention provides an audio-intonation calibration method in which an audio signal emitted by a subject is reproduced to the auditory organs of said subject after real time processing.

According to the invention, the above method is characterized in that it comprises the following steps:
   acquisition of a model audio signal to be imitated;
   spectral analysis of said model audio signal;
   acquisition of an imitation audio signal emitted by the subject;
   spectral analysis of the imitation audio signal;
   comparison of the spectra of the model audio signal and the imitation audio signal;
   correction of the imitation audio signal as a function of the result of said comparison; and
   reproduction to the auditory organs of the subject of the corrected audio signal.

By analyzing the frequency content of an audio signal to be imitated and of an audio signal imitated by a subject, the present invention transforms the intonation of the person by real time modification of the harmonic content of his utterance and reproduction of the signal that has been corrected on the basis of the frequency analysis.

Thus the calibration method increases or decreases in real time the intensity of the various frequencies contained in the imitation audio signal compared to a prerecorded model audio signal.

This kind of calibration method enables the subject to reproduce very accurately any type of voice, on the basis of an audio signal to be imitated. Consequently, it finds an application not only in practicing speaking a foreign language, in which case it is possible to imitate series of words or phrases pronounced by a native speaker, but also in performing a song, karaoke style, in which case it becomes possible to reproduce the intonations of a singer when performing a song.

In accordance with preferred features of the invention, the above audio-intonation calibration method further includes the following steps:
   measurement of the dynamic range of the audio signal imitated by the subject;
   measurement of the dynamic range of the corrected audio signal;
   comparison of the dynamic range of the imitation audio signal and the corrected audio signal; and
   correction of the dynamic range of the corrected audio signal as a function of the result of said comparison before reproduction to the auditory organs of the subject of the corrected audio signal.

In this way it is possible to modify the overall envelope of the corrected signal as a function of the imitation audio signal to prevent the corrected signal reproduced to the subject having a dynamic range that is too different from the audio signal emitted by the subject.

According to preferred features of the invention, the above calibration method further includes a step of storing the spectral analysis of the model audio signal to be imitated.

Accordingly, it is possible to use the spectral analysis of the model audio signal to implement the audio-intonation calibration method when the audio signal to be imitated is repeated by a subject after a time delay.

It is particularly practical, in particular when practicing speaking a language, if the audio-intonation calibration method includes a step of emitting the model audio signal to be imitated into the auditory organs of the subject prior to the step of acquiring the audio signal imitated by the subject.

Having the subject listen to the signal to be imitated before imitating it further facilitates practicing speaking a language and improvement of the intonation when speaking a word or a phrase in a foreign language.

In a first application of the above audio-intonation calibration method, the present invention provides a method of practicing speaking a language being studied, in which method an audio signal emitted by a subject is reproduced to the auditory organs of the subject after real time processing. This acquisition method uses the audio-intonation calibration method according to the invention.

Alternatively, in a second application, the present invention also provides a method of performance of a song by a subject, in which method an audio signal emitted by a subject is reproduced to the auditory organs of the subject after real time processing. This method of performing a song also uses the audio-intonation calibration method according to the invention.

Finally, the present invention also provides fixed or removable information storage means containing software code portions adapted to execute the steps of the audio-intonation calibration method, of the method according to the invention of practicing speaking a language being studied, or of the method according to the invention of performing a song.

Other features and advantages of the invention will become more apparent in the course of the following description.

BRIEF DESCRIPTION OF THE DRAWINGS

In the appended drawings, which are provided by way of non-limiting example:

FIGS. 2a, 2b, 2c are diagrams showing steps of the audio-intonation calibration method shown in FIG. 1 or FIG. 5;

DESCRIPTION OF THE PREFERRED EMBODIMENTS

Figure 1:
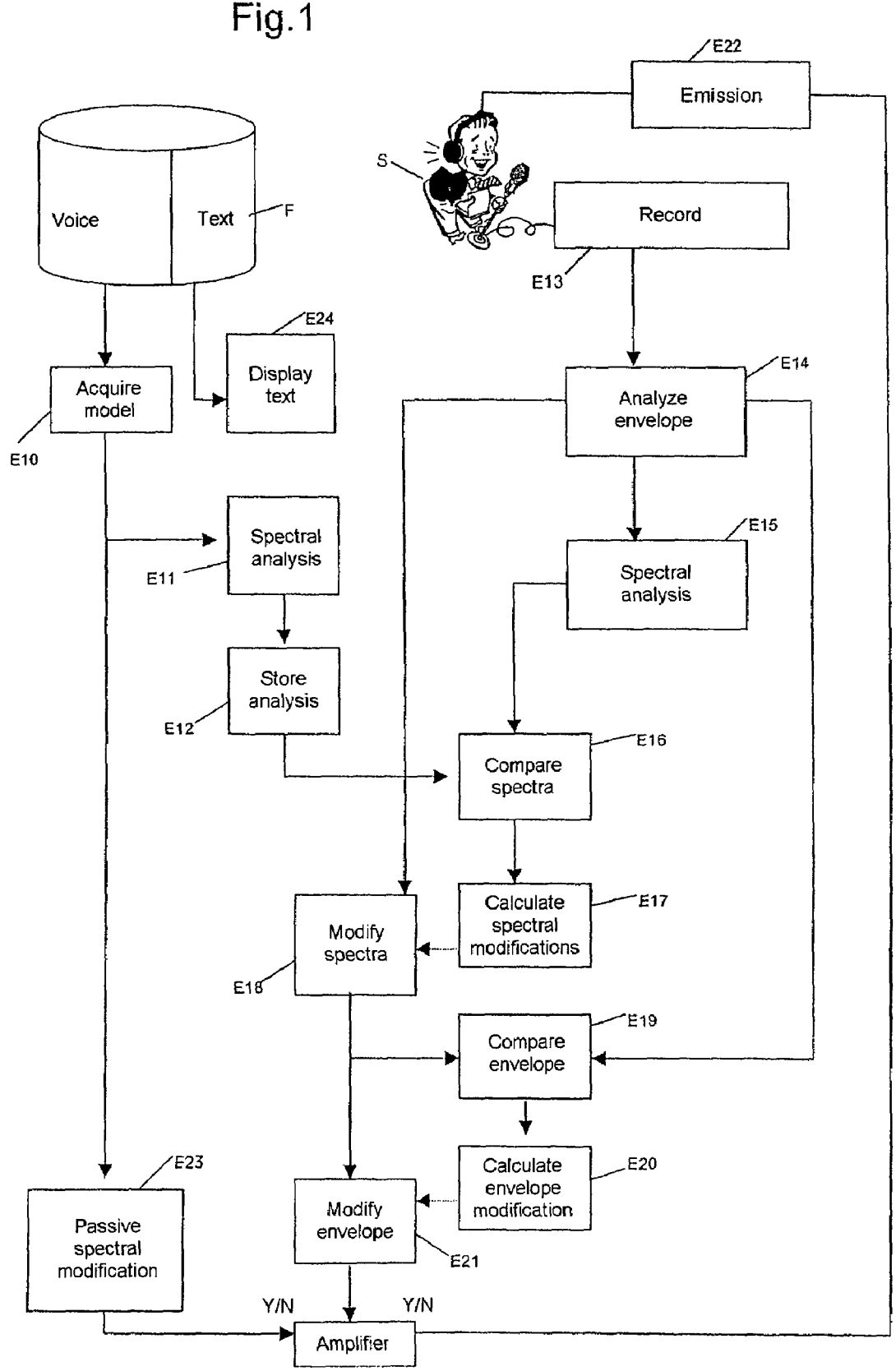
FIG. 1 is an algorithm showing a first embodiment of an audio-intonation calibration method according to the invention.

A first embodiment of an audio-intonation calibration method in accordance with the invention is described first with reference to FIG. 1.

In this example the audio-intonation calibration method is used in a method of practicing speaking a language.

The invention is based on the fact that each language uses one or more spectral bands with intensities that are specific to it. Thus the ear of each subject becomes accustomed to perceiving the spectral fields that are specific to his native language. Now, the voice reproduces only what the ear hears, so that it is difficult for a subject to pronounce correctly words in a foreign language when his ear is not accustomed to hearing the fields specific to the new language being studied.

The audio-intonation calibration method according to the invention therefore re-educates the ear of a subject by causing the subject to hear in a pronounced manner the fields specific to the language being studied.

This method comprises first of all a step E10 of acquiring a model audio signal to be imitated.

In the case of a foreign language, this audio signal can be a word or a set of words pronounced by a native speaker of the language being studied.

A model is preferably acquired from a computer file on which different model audio signals can be stored.

These sound files F can be stored on a computer hard disk or any other data medium, such as a CD-ROM, a memory card, etc, or downloaded via a communication network such as the Internet.

The audio signal to be imitated is then analyzed in a spectral analysis step E11.

The intensity specific to each of the frequency bands analyzed is measured in the analysis step E11.

FIG. 2a shows one example of the result of this spectral analysis. The analysis step E11 is therefore executed over a series of frequency bands within the range of audible frequencies from 30 Hz to 10 000 Hz.

The series of frequency bands corresponds to a subdivision of the frequency range.

In practice, the frequency range is divided into at least 50 frequency bands, and preferably into at least 160 frequency bands, in order to obtain a sufficiently fine analysis of the audio signal.

FIG. 2a shows this kind of subdivision over a range of frequencies from 50 Hz to 1 500 Hz.

Thus the intensity in decibels of each frequency band present in the audio signal to be imitated can be measured.

In this first embodiment, the result of this spectral analysis (i.e. the analysis shown in FIG. 2a in the present example) is stored in a file in a memorization step E12.

The audio-intonation calibration method also includes a step E13 of acquiring an audio signal imitated by a subject S. In this acquisition step E13, an imitation audio signal emitted by the subject S is picked up via a microphone, for example.

In this embodiment, the dynamic range of the imitation audio signal is first measured in a measurement step E14.

The measurement step E14 thus determines the overall envelope of the imitation audio signal.

According to the invention, a spectral analysis step E15 is then applied to the imitation audio signal.

The spectral analysis step E15 is similar to that previously described for the audio signal to be imitated, and analyzes the intensity of the audio signal recovered in this way from the subject S over a series of frequency bands.

As shown in FIG. 2b, this provides a spectrum enabling the intensity of the signal in each frequency band to be determined over a range of frequencies from 30 Hz to 10 000 Hz.

FIG. 2b shows one example of this spectrum over the range of frequencies from 50 Hz to 1 500 Hz.

The subdivision into frequency bands is identical to that used in the step E11 of spectral analysis of the audio signal to be imitated.

The spectra of the model audio signal and the imitation audio signal are then compared in a comparison step E16.

As shown in FIG. 2c, the result of this comparison is used in a calculation step E17 to calculate the spectral modifications to be made to the imitation audio signal.

As shown clearly in FIG. 2c, and band by band, each frequency band of the imitation audio signal is compared with each frequency band of the audio signal to be imitated, and is corrected so that the intensity values of the imitation audio signal correspond to those of the model to be imitated.

In practice, a correction to be added to or subtracted from the level of each frequency band is deduced from this calculation step.

The calculation step therefore defines the modifications to be applied in each frequency band by adding to or subtracting from the model audio signal.

The result of the calculation is used to correct the imitation audio signal in a step E18. In practice, the parameters of a dynamic multiband equalizer are set so that the frequency fields of the imitation audio signal are equal to those of the acquired model audio signal.

The parameters are set by automatic gain control in each frequency band.

In this preferred embodiment, the dynamic range of the corrected audio signal after the correction step E18 is measured in order to compare the dynamic range of the imitated signal and the dynamic range of the corrected audio signal in a comparison step E19.

A calculation step E20 defines the dynamic range modification to be applied to the signal. The result of this calculation is used to correct the dynamic range of the corrected audio signal in a correction step E21.

In practice, the result of the calculation obtained in the calculation step E20 is used to set the parameters of a variable gain amplifier adapted to adjust the dynamic range of the signal.

The parameters are set by overall automatic gain control.

The calibration method then includes an emission step E22 which reproduces the corrected audio signal to the auditory organs of the subject S.

This emission is effected conventionally by means of an amplifier whose output is connected to headphones.

The amplifier enables the subject S to listen selectively either to the imitation audio signal to which the processing previously described has been applied or to the model audio signal acquired in the acquisition step E10.

The step of emitting the model audio signal to be imitated into the auditory organs of the subject S is therefore preferably executed before the step E13 of acquisition of the imitation audio signal emitted by the subject S.

A modification step E23 is preferably adapted to modify the model audio signal to be imitated as a function of parameters representative of a language being studied.

In practice, the audio signal to be imitated passes through a preset multiband graphic equalizer, i.e. an equalizer whose parameters are preset as a function of a chosen language to accentuate frequency bands specific to that language.

In this way, the subject S perceives more clearly the frequency areas in which his ears are usually relatively insensitive.

In order additionally to facilitate the work to be done by the subject S, and in particular the repetition of the audio signal to be imitated by the subject S, if the audio signal is a text, the method preferably includes a step E24 of displaying the text, for example on a screen associated with the computer.

A method of practicing speaking a language being studied using the audio-intonation calibration method shown in FIG. 1 is described next with reference to FIG. 3.

This method of practicing speaking a language thus improves the pronunciation of a subject S when speaking a chosen language.

Figure 3:
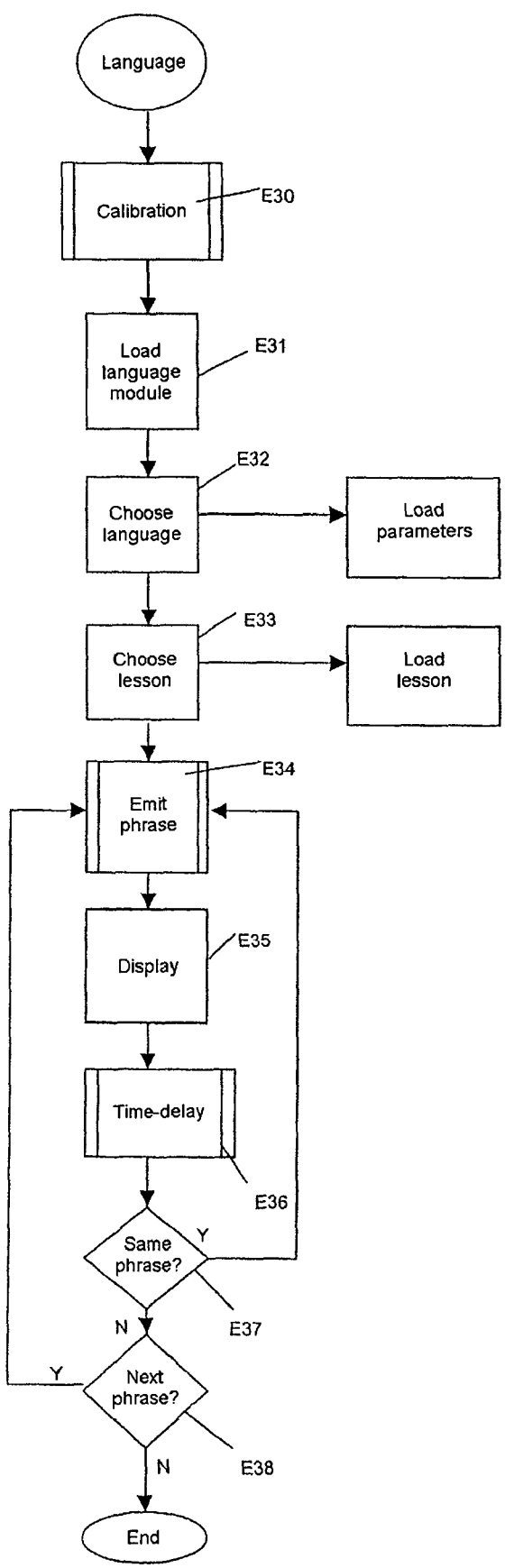
FIG. 3 is an algorithm of one embodiment of a method in accordance with the invention of practicing speaking a language.

The acquisition method shown in FIG. 3 includes first of all a calibration step E30.

Figure 4:
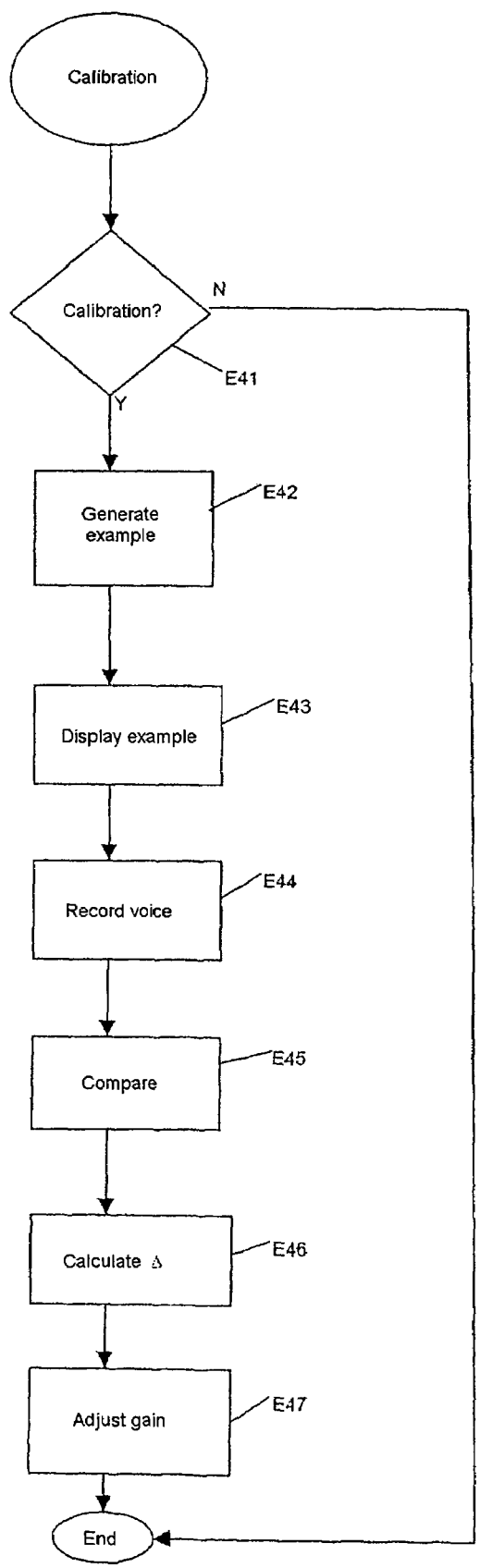
FIG. 4 is an algorithm of a calibration step shown in FIG. 3 and FIG. 6.

This calibration step is shown in FIG. 4.

In its general principle, this calibration step automatically adjusts the input level of a computer sound card by comparing, before it begins to be used, the level of a phrase that a subject S pronounces with a prerecorded example.

This calibration enables the student to work autonomously on the method of practicing speaking, preventing too low or too high sound input levels, which could interfere with the correct functioning of the method.

To this end, this calibration step includes a test step E41 during which the subject can decide whether to carry out the calibration or not. In particular, if the computer and the associated sound card have just been used by the same subject, the calibration step can be omitted.

If the calibration is to be carried out, a step E42 of generating an example generates a reference audio signal.

A display step E43 displays text corresponding to the audio signal generated in the generation step E42.

The subject then repeats the audio signal example and his voice is recorded in a recording step E44.

Comparing the overall intensity of the audio signal example and the audio signal emitted by the subject in a comparison step E45 enables an intensity level difference between the two audio signals to be calculated in a calculation step E46.

The input gain of the computer sound card is then adjusted in an adjustment step E47.

Returning to FIG. 3, when the calibration step has been executed, a loading step E31 loads software comprising the code of the method of practicing speaking a language.

In this embodiment, the same software can be used for different languages.

Of course, separate software could be used for different foreign languages.

In this embodiment the required language is chosen in a choice step E32.

The choice step E32 loads into the computer all of the parameters associated with the language concerned.

In particular, the parameters include one or more frequency spectra specific to the language being studied.

A particular lesson can be chosen in a second choice step E33.

There can be a plurality of lessons for each language, each lesson comprising a particular number of prerecorded words or phrases.

The lessons can be graded as a function of a level of language difficulties or as a function of different phonemes to be worked on and specific to each language.

In practice, the parameters and the lesson are loaded conventionally into the random access memory (RAM) of the computer.

The acquisition method then includes a step E34 of emitting a phrase or a word to be repeated.

This step of emitting a phrase corresponds to the acquisition step E10 and the spectral modification step E23 shown in FIG. 1.

In the emission step E34, the active input of the amplifier is a recording stored in the sound file F.

Thus the emission step E34 enables the subject S to hear an audio signal to be imitated corresponding to a word or a phrase of a text spoken by a native speaker of the language being studied.

The analysis step E11 and the spectral analysis storage step E12 shown in FIG. 1 are executed at the same time.

To facilitate memorization by the subject of the term to be repeated, a display step E35 corresponding to the display step E24 shown in FIG. 1 is executed at the same time as the step E34 of emitting a phrase.

The acquisition method then includes a time-delay step E36 in which all of the steps E13 to E22 shown in FIG. 1 are executed.

Accordingly, during this time-delay, the subject repeats the audio signal to be imitated, which is corrected as previously described and reproduced to the ears of the subject in real time, so that the subject unconsciously and spontaneously modifies his own utterance.

The duration of this time-delay step E36 substantially corresponds to the duration of the audio signal to be imitated, plus a few seconds to allow the subject to repeat the word or phrase.

The time-delay can be adjustable, for example by the subject, should he require less time or more time to repeat the various words or phrases.

Progress through the lesson, i.e. through the succession of words to be repeated and the repeated words, can be automatic or manual.

In this embodiment, a test step E37 asks the subject if he wishes to work again on the same phrase or the same word.

If so, the emission step E34, the display step E35, and the time-delay step E36 are executed on the same audio signal.

If not, a second test step E38 asks the subject if he wishes to work again on a subsequent phrase or word.

If so, the emission step E34, the display step E35, and the time-delay step E36 are also executed on a subsequent prerecorded word or phrase in the current lesson.

Otherwise, the lesson is stopped.

Thus groups of phrases or words can be repeated in looped fashion, the student being able to do more or less work on certain parts of the lesson.

After a number of sessions, the ears of the subject become accustomed to perceiving the language and the perception of the new frequency fields that are fed to his ear becomes permanent. The utterance of the subject is then also permanently modified.

A similar method allowing a subject to execute a song is described next with reference to FIGS. 5 and 6.

In this application, the audio-intonation calibration method modifies the intonation of a subject in order to adapt his manner of singing optimally to that of a prerecorded singer.

It therefore enables a subject to sing in the manner of a singer, and can be used in a karaoke system, for example.

Figure 5:
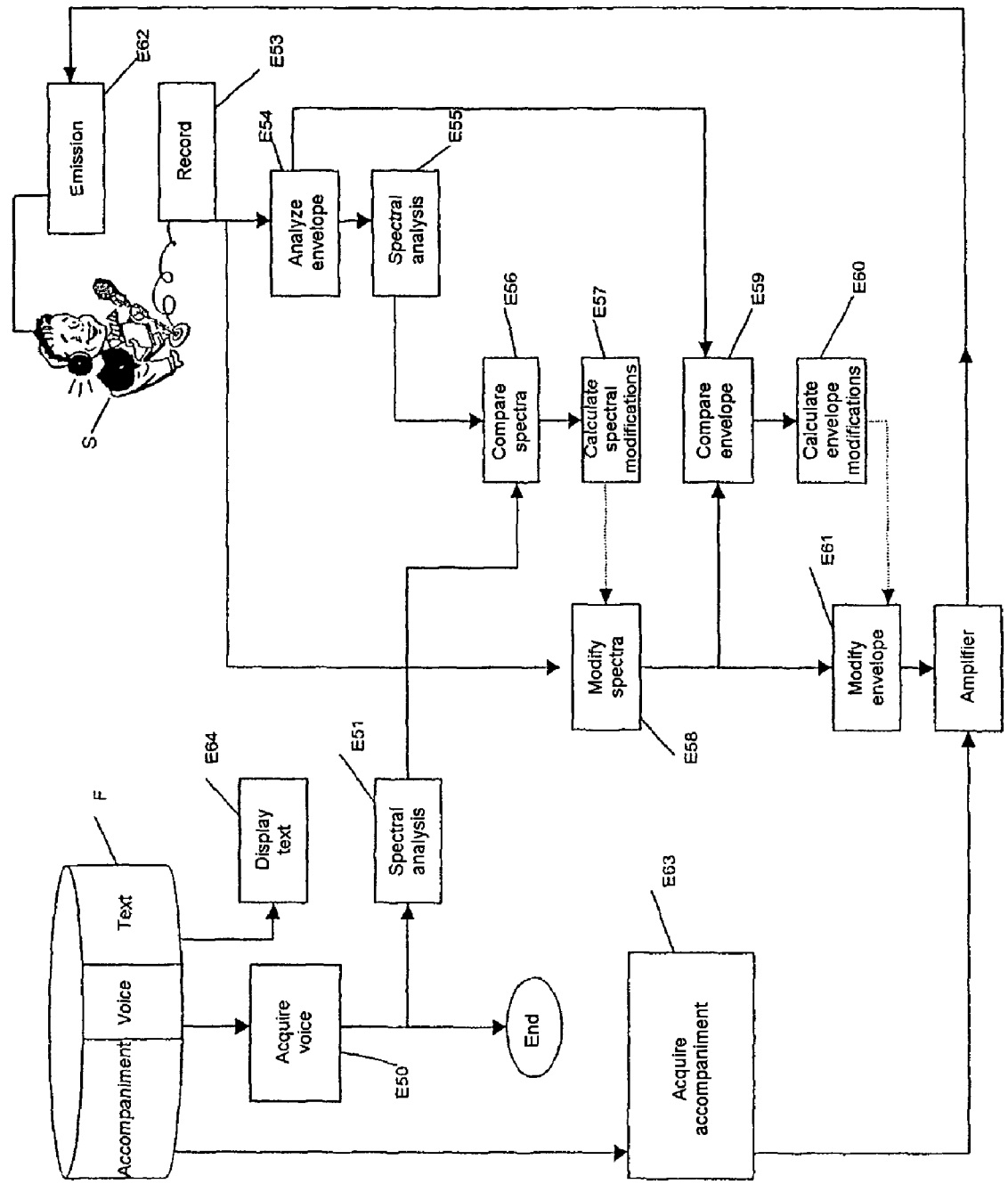
FIG. 5 is an algorithm of a second embodiment of an audio-intonation calibration method according to the invention.

The audio-intonation calibration method in accordance with the invention is described first with reference to FIG. 5, and is similar to that used in the FIG. 1 method of practicing speaking a language.

In the present application, the file F is adapted to store one or more songs. In practice, for each song there are three sound files, one containing only the voice of the artist, the other the accompaniment associated with the song, and the third the text of the song.

As previously, this sound file can be stored on a hard disk of a computer or on any other data medium (CD-ROM, memory card, etc). It can also be obtained by downloading it from a communication network such as the Internet.

Unlike the audio-intonation calibration method shown in FIG. 1 (in which the step E10 of acquiring a model and the step E11 of spectral analysis of the model, on the one hand, and the step E13 of recording and the step E15 of spectral analysis of the imitation audio signal, on the other hand, are carried out alternately, thereby necessitating a step E12 of storing the spectral analysis of the audio signal to be imitated, for later comparison), here a step E50 of acquiring an audio signal to be imitated, corresponding to the voice of the singer, is executed simultaneously with the step E53 of recording the imitation audio signal emitted by the subject S.

As previously, the spectral analysis steps E51 and E55 are applied to the audio signal to be imitated and to the imitation audio signal, respectively, and the result is fed to the input of a comparator in order to carry out a spectrum comparison step E56.

The comparison step E56 is followed by a calculation step E57 for calculating the modifications to be made to the imitation audio signal as a function of the recorded model.

These comparison and calculation steps are similar to those described with reference to FIGS. 2a, 2b, 2c.

To obtain a thorough spectral analysis, the frequency range is preferably divided into at least 160 frequency bands.

The modifications calculated in this way are applied by automatic gain control in each band to modify the imitation audio signal in a correction step E58.

As previously, the correction can be applied by a dynamically adjustable graphic equalizer for adjusting the imitation audio signal, frequency band by frequency band, until it is as close as possible to the acquired model.

Before reproducing the corrected signal to the subject, an envelope modification step E61 is executed, as previously.

In practice, a step E54 of analyzing the dynamic range of the audio signal recorded in the recording step E53 provides the overall intensity of the signal. A comparison step E59 compares the dynamic range of the recorded audio signal to the dynamic range of the corrected audio signal in the correction step E58.

A calculation step E60 calculates the modifications to be made to the corrected audio signal. These modifications are applied by overall automatic gain control to modify the corrected audio signal in a modification step E61. This envelope modification is effected by means of a variable gain amplifier.

The audio signal corrected in this way is reproduced to the subject via an amplifier in an emission step E62.

Accordingly, in this audio-intonation calibration method, the amplifier receives simultaneously at its input a corrected audio signal and an accompaniment signal acquired from the sound file F in an acquisition step E63.

The subject therefore hears simultaneously the accompaniment and his voice as corrected by the processing previously described.

To facilitate the execution of the song, a display step E64 displays the text simultaneously with the playing of the song.

Figure 6:
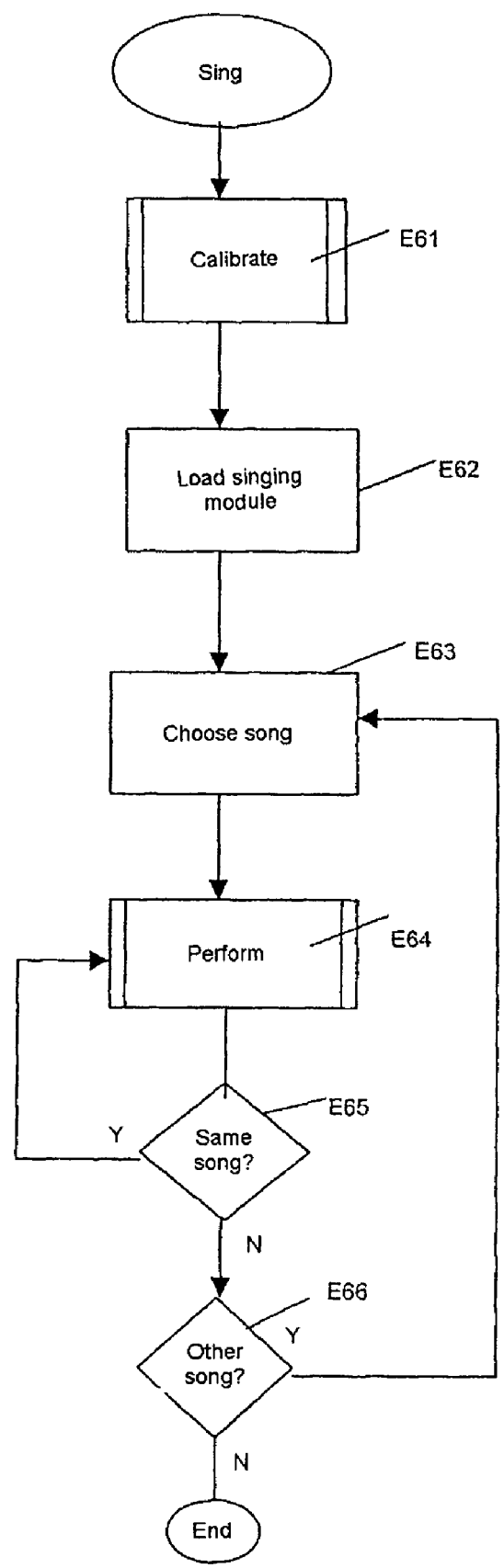
FIG. 6 is an algorithm of one embodiment of a method in accordance with the invention of performing a song.

In practice, and as shown in FIG. 6, this audio-intonation calibration method can be used in a more complex system for karaoke style execution of a song by a subject.

In this method of performing a song, a calibration step E61 can be executed before performing a song.

This calibration step corresponds to the calibration step described with reference to FIG. 4 and adjusts the input gain of the computer sound card.

A loading step E62 is adapted to load software comprising the code of the method of performing a song.

A choice step E63 in practice enables the subject to choose a song from those stored in the sound file F.

A step E64 of performing the song is then executed as described previously with reference to FIG. 5.

During the playing of a song, the file containing only the accompaniment is fed to the subject S via the amplifier and headphones.

Simultaneously, the text of the song is displayed on the screen of the computer in a display step E64. The model file containing the voice is read simultaneously and in perfect synchronization with the file containing the accompaniment. The subject also sings simultaneously with the accompaniment so that the spectral analysis of the two audio signals can be carried out simultaneously to apply the appropriate modifications in real time to the imitation audio signal.

To facilitate simultaneity in the interpretation of the song, assistance can be provided by the emission of a metronome signal and possibly a cursor shown on the text of the song to indicate which portion of the text should be sung.

The perception of the sound he emits as modified in real time causes the subject to modify the sound he emits unconsciously and also in real time.

He is therefore caused to sing in the manner of the prerecorded singer.

When the song is finished, a test step E65 enables the subject to choose to perform the same song again.

If so, the performance step E64 is repeated on the same content of the sound file.

If not, a second test step E66 enables the subject to choose another song.

If the subject opts to choose another song, the choice step E63 is repeated to select one of the prerecorded songs in the sound file.

The performance step E64 is then executed for the new song.

The method of performing a song terminates when no other song is selected after the test step E66.

Figure 7:
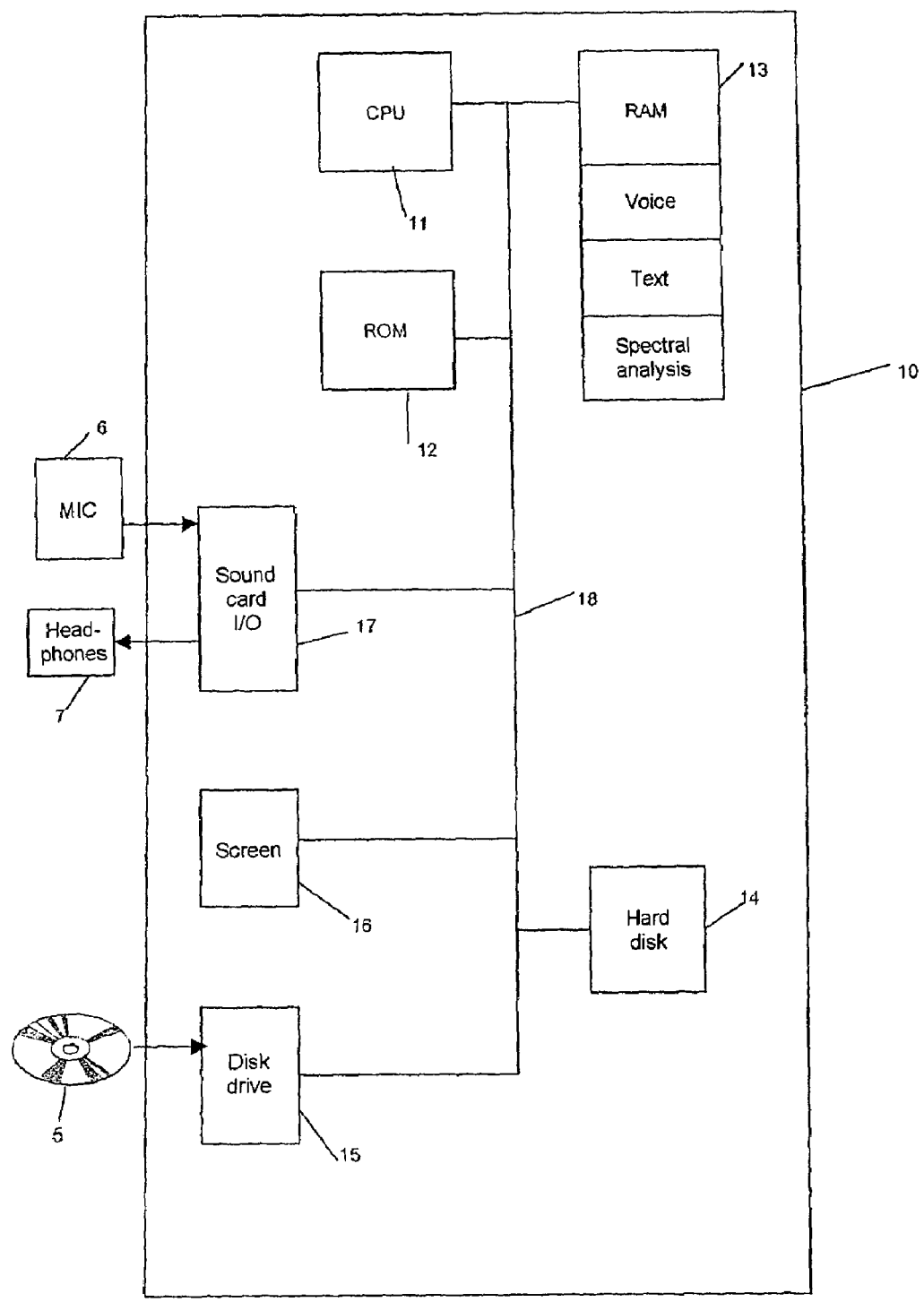
FIG. 7 is a block diagram of a computer adapted to implement the invention.

The audio-intonation calibration method used to perform a song or to practice speaking a language being studied can be implemented on a computer 10 as shown in FIG. 7.

All of the means employed by the method are incorporated into a microprocessor (CPU) 11 and a read only memory (ROM) 12 is adapted to store an audio-intonation calibration program and a program for performing a song or practicing speaking a language.

A random access memory (RAM) 13 is adapted to store in registers values modified during execution of these programs.

In practice, the RAM comprises registers adapted to memorize the sound files F and the spectral analysis results.

The microprocessor 11 is integrated into a computer which may be connected to a communication network via a communication interface.

The computer further includes means for storing documents, such as a hard disk 14, or is adapted to cooperate with removable document storage means, such as disks 5, by means of a disk (floppy disk, compact disk) drive 15, or by means of a computer card.

The fixed or removable storage means can therefore contain the code of the audio-intonation calibration method and the code of the method of practicing speaking a language or of the method of performing a song.

The code of these methods can be stored on the hard disk of the computer 10, for example, and the sound files used in the various applications can be stored separately on disks 5 adapted to cooperate with the disk drive 15.

Alternatively, the program for implementing the invention can be stored in the read only memory 12.

The computer 10 also has a screen 16 providing an interface with the subject S, in particular to display to the subject the text to be repeated or sung.

A sound card 17 is also provided and is adapted to cooperate with a microphone 6 and headphones 7 to emit an audio signal or to receive an audio signal emitted by the subject.

The central processor unit 11 then executes instructions relating to implementation of the invention. On powering up, the programs and methods relating to the invention stored in a memory, for example the read only memory 12, are transferred into the random access memory 13, which then contains the executable code of the invention and the variables necessary to implement the invention.

A communication bus 18 provides communication between various subsystems that are part of the computer 10 or connected to it.

The representation of the bus 18 is not limiting on the invention, and in particular the microprocessor 11 could communicate instructions to any subsystem, either directly or via another subsystem.

Thanks to the invention, the audio-intonation calibration method can be implemented on a personal computer and can be used by a subject S without requiring external intervention.

In particular, to practice speaking a language, the subject S can work on his intonation using different prerecorded sound files, without necessitating the presence of a tutor.

Of course, many modifications can be made to the embodiments previously described without departing from the scope of the invention.

The invention claimed is:

1. A method of practicing speaking a language being studied, in which an audio signal emitted by a subject (S) is reproduced to the auditory organs of said subject (S) after real time processing, which method is characterized in that it comprises the following steps:
   acquisition (E10, E50) of a model audio signal to be imitated;
   emission (E22) of the model audio signal to be imitated to the auditory organs of the subject (S);
   first spectral analysis (E11, E51) of said model audio signal that has been emitted;
   acquisition (E13, E53) of an imitation audio signal that corresponds to the model audio signal and has been imitated by the subject (S) while the subject is practicing speaking the language being studied;
   second spectral analysis (E15, E55) of the imitation audio signal;
   comparison (E16, E56) of the spectra of the model audio signal and the imitation audio signal;
   correction (E18, E58) of the imitation audio signal as a function of the result of said comparison,
   wherein at least the second spectral analysis step, the comparison step, and the correction step are carried out in real time and constitute the real time processing; and
   after the real time processing, reproduction (E22, E62) to the auditory organs of the subject (S) of the corrected imitation audio signal.

2. The method according to claim 1, characterized in that it further includes the following steps:
   measurement (E14, E24) of the dynamic range of the audio signal imitated by the subject (S);
   measurement (E18, E28) of the dynamic range of the corrected audio signal;
   comparison (E19, E59) of the dynamic range of the imitation audio signal and the corrected audio signal; and
   correction (E21, E61) of the dynamic range of the corrected audio signal as a function of the result of said comparison before reproduction to the auditory organs of the subject (S) of the corrected audio signal.

3. The method according to claim 1, characterized in that the comparison steps (E16, E56) and correction steps (E18, E58) are executed over a series of frequency bands in the range of audible frequencies.

4. The method according to claim 3, characterized in that the series of frequency bands corresponds to a subdivision of the range of audible frequencies.

5. The method according to claim 3, characterized in that the range of audible frequencies is divided into at least 50 frequency bands.

6. The method according to claim 1, characterized in that the model audio signal to be imitated is a text and in that said method further includes a step (E24, E64) of displaying said text.

7. The method according to claim 1, characterized in that it further includes a step (E12) of memorizing the spectral analysis of said model audio signal to be imitated.

8. The method according to claim 1, characterized in that it further includes, before the emission step (E22), a step (E23) of modifying the model audio signal to be imitated as a function of parameters representative of a language being studied.

9. Fixed or removable information storage means, characterized in that said means contain software code portions adapted to execute the steps of the method according to claim 1.

10. The method according to claim 1, wherein during the correction step, each frequency band of the imitation audio signal is corrected so that an intensity value of the imitation audio signal in the respective band corresponds to an intensity value of the model audio signal in the respective band.

11. The method according to claim 1, wherein the reproduction step includes reproducing the corrected imitation audio signal in headphones on auditory organs of the subject.

12. The method according to claim 1, wherein the first spectral analysis step includes dividing the model audio signal into a multiplicity of frequency bands and determining an intensity of the model audio signal in each of the frequency bands, wherein the second spectral analysis step includes dividing the imitation audio signal into same frequency bands as in the first spectral analysis step and determining an intensity of the imitation audio signal in each of the frequency bands, wherein the comparison step includes, for each of the frequency bands, comparing the intensity of the model audio signal to the intensity of the imitation audio signal, and wherein the correction step includes correcting the imitation audio signal so that, for each of the frequency bands, an intensity of the corrected imitation audio signal corresponds to the intensity of the model audio signal.

13. The method according to claim 1, further comprising a steps of choosing the language being studied and loading parameters associated with the language being studied.

14. The method according to claim 13, wherein the choosing step includes choosing a lesson from a plurality of lessons for practicing speaking the language being studied, the lesson comprising pre-recorded words or phrases to be imitated.

15. A method of practicing speaking a language being studied, in which an audio signal emitted by a subject is reproduced to auditory organs of the subject after real time processing, the method comprising the steps of:
　　acquiring a model audio signal that is to be imitated be the subject;
　　emitting the model audio signal to be imitated to the auditory organs of the subject;
　　performing a first spectral analysis of the model audio signal including dividing the model audio signal into a multiplicity of frequency bands and determining an intensity of the model audio signal in each of the frequency bands;
　　emitting, by the subject while the subject is practicing speaking the language being studied, an imitation audio signal that corresponds to the model audio signal;
　　performing a second spectral analysis of the imitation audio signal including dividing the imitation audio signal into same frequency bands as in the first spectral analysis step and determining an intensity of the imitation audio signal in each of the frequency bands;
　　comparing, for each of the frequency bands, the intensity of the model audio signal to the intensity of the imitation audio signal;
　　correcting the imitation audio signal as a function of the result of the comparison step so that, for each of the frequency bands, an intensity of a corrected imitation audio signal corresponds to the intensity of the model audio signal,
　　wherein at least the second spectral analysis step, the comparing step, and the correcting step are carried out in real time and constitute the real time processing; and
　　after the real time processing, reproducing to the auditory organs of the subject the corrected imitation audio signal.

* * * * *

UNITED STATES PATENT AND TRADEMARK OFFICE
CERTIFICATE OF CORRECTION

PATENT NO. : 7,634,410 B2  Page 1 of 1
APPLICATION NO. : 10/634744
DATED : December 15, 2009
INVENTOR(S) : Lemoine et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1012 days.

Signed and Sealed this

Twenty-first Day of December, 2010

David J. Kappos
*Director of the United States Patent and Trademark Office*